US 12,344,190 B2

(12) United States Patent
Liu et al.

(10) Patent No.: US 12,344,190 B2
(45) Date of Patent: Jul. 1, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Haisong Liu, Tokyo (JP); Ryo Morosawa, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 279 days.

(21) Appl. No.: 17/680,344

(22) Filed: Feb. 25, 2022

(65) Prior Publication Data
US 2022/0306042 A1 Sep. 29, 2022

(30) Foreign Application Priority Data

Mar. 24, 2021 (JP) .................. 2021-050004

(51) Int. Cl.
B60R 25/01 (2013.01)
B60R 25/25 (2013.01)
(Continued)

(52) U.S. Cl.
CPC .............. B60R 25/01 (2013.01); B60R 25/25 (2013.01); G06T 7/20 (2013.01); G06V 20/58 (2022.01);
(Continued)

(58) Field of Classification Search
CPC ....... B60R 25/01; B60R 25/25; B60R 25/403; B60R 16/033; B60R 25/305; G06T 7/20;
(Continued)

(56) References Cited

U.S. PATENT DOCUMENTS 6,552,649 B1 * 4/2003 Okada ................ G07C 9/00309
340/10.33
10,850,709 B1 * 12/2020 Nagata ............... G07C 9/00563
(Continued)

FOREIGN PATENT DOCUMENTS

CN 107679514 2/2018
CN 110663247 1/2020
(Continued)

OTHER PUBLICATIONS

Machine Translation: JP-2007249587-A (Year: 2007).*
(Continued)

Primary Examiner — Anne Marie Antonucci
Assistant Examiner — Connor L Knight
(74) Attorney, Agent, or Firm — Amin, Turocy & Watson, LLP

(57) ABSTRACT

A vehicle control device is provided. The vehicle control device includes a processor that executes a program to image surroundings of a vehicle, detect a first face of a person in the surroundings with a first accuracy and while operating at a first power consumption, and determine, while operating at a second power consumption higher than the first power consumption, whether or not the first face is a face of a registered user registered in advance. If the first face is the face of the registered user, the processor executes the program to release a lock of a door. If the first face is not the face of the registered user, the processor executes the program to set a detection area as a determination prohibition area in which additional determinations of faces are not performed.

12 Claims, 8 Drawing Sheets

(51) Int. Cl.
    *G06T 7/20* (2017.01)
    *G06V 20/58* (2022.01)
    *G06V 40/16* (2022.01)
    *H04N 5/232* (2006.01)
    *H04N 7/18* (2006.01)
    *H04N 23/65* (2023.01)

(52) U.S. Cl.
    CPC ......... *G06V 40/166* (2022.01); *G06V 40/172* (2022.01); *H04N 7/18* (2013.01); *H04N 23/65* (2023.01); *G06T 2207/30201* (2013.01); *G06T 2207/30252* (2013.01)

(58) Field of Classification Search
    CPC .......... G06T 2207/30201; G06T 2207/30252; G06V 20/58; G06V 40/166; G06V 40/172; G06V 40/16; H04N 7/18; H04N 23/65; H04N 7/188; H04N 23/611; H04N 23/651; G07C 9/37
    See application file for complete search history.

(56) References Cited

U.S. PATENT DOCUMENTS

| | | | | |
|---|---|---|---|---|
| 2002/0097145 | A1* | 7/2002 | Tumey | B60R 25/255 340/5.53 |
| 2008/0252412 | A1* | 10/2008 | Larsson | B60R 25/25 340/5.2 |
| 2019/0370578 | A1* | 12/2019 | Meng | B60W 50/14 |
| 2020/0139931 | A1* | 5/2020 | Mukasa | E05B 49/00 |
| 2021/0001810 | A1* | 1/2021 | Rivard | G06V 40/172 |
| 2021/0264137 | A1* | 8/2021 | Rao | G06V 20/52 |
| 2022/0074242 | A1* | 3/2022 | Kim | E05B 83/36 |
| 2022/0230456 | A1* | 7/2022 | Kasarla | G06F 3/013 |
| 2023/0042025 | A1* | 2/2023 | Kim | G06V 40/20 |

FOREIGN PATENT DOCUMENTS

| | | | | |
|---|---|---|---|---|
| CN | 110956102 A | * | 4/2020 | ......... G06K 9/00362 |
| EP | 3648449 | | 5/2020 | |
| JP | 11-043016 | | 2/1999 | |
| JP | 2003-138817 | | 5/2003 | |
| JP | 2004-324183 | | 11/2004 | |
| JP | 2006-274677 | | 10/2006 | |
| JP | 2007249587 A | * | 9/2007 | |
| WO | 2019/003826 | | 1/2019 | |

OTHER PUBLICATIONS

Machine Translation: CN-110956102-A (Year: 2020).*
Japanese Notice of Allowance for Japanese Patent Application No. 2021-050004 mailed Nov. 8, 2022.
Chinese Office Action for Chinese Patent Application No. 202210169109.2 mailed Apr. 14, 2025.

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2021-050004, filed Mar. 24, 2021, the content of which is incorporated herein by reference.

BACKGROUND OF THE INVENTION

Field of the Invention

The present invention relates to a vehicle control device, a vehicle control method, and a storage medium.

Description of Related Art

In the related art, various keyless entry systems have been proposed for a door lock of a vehicle. For example, a keyless entry system that images an iris of a person who touches a doorknob and performs authentication using information on the imaged iris has been disclosed (see, for example, Japanese Unexamined Patent Application, First Publication No. 2003-138817).

SUMMARY OF THE INVENTION

However, with the related art, when a high-precision camera is started frequently, power consumption may increase and an amount of electricity stored in a battery may decrease.

Aspects of the present invention have been made in consideration of such circumstances, and an object of the present invention is to provide a vehicle control device, a vehicle control method, and a storage medium capable of curbing decrease in an amount of electricity stored in a battery.

In order to solve the above problem and achieve the above object, the present invention has adopted the following aspects.

(1): A vehicle control device according to an aspect of the present invention includes an imaging unit configured to image surroundings of a vehicle; a detection unit configured to detect a face of a person in the surroundings with a first accuracy using an imaging result of the imaging unit operating at first power consumption; a user determination unit configured to operate the imaging unit with a second power consumption higher than the first power consumption when the face is detected by the detection unit, and determine whether or not the face detected by the detection unit is a face of a registered user registered in advance with a second accuracy higher than the first accuracy using the imaging result of the imaging unit operating with the second power consumption; a lock release unit configured to release a lock of a door according to a result of the determination in the user determination unit; and a setting unit configured to set a detection area in which the face is detected by the detection unit as a determination prohibition area in which the determination by the user determination unit is not performed when the user determination unit determines that the face is not the face of the registered user.

(2): In the aspect (1), the user determination unit may perform the determination of the registered user a plurality of times, and the setting unit may set the detection area as the determination prohibition area on the basis of results of a plurality of determinations in the user determination unit.

(3): In the aspect (1) or (2), the determination prohibition area may be an area in which detection of a face in the detection unit is prohibited.

(4): In the aspect (1) or (2), the determination prohibition area may be an area in which detection of a face in the detection unit is possible, and the user determination unit may not perform a determination of the registered user based on a face detected from the determination prohibition area by the detection unit.

(5): In the aspect (1) or (2), the determination prohibition area may be an area in which detection of a face in the detection unit is possible, the vehicle control device may include a matching determination unit configured to perform a determination as to whether or not a face in the detection area matches a face detected from the determination prohibition area, and the user determination unit may not perform a determination of the registered user based on the face determined to match by the matching determination unit.

(6): In the aspect (4) or (5), the detection unit may detect a movement of the face in the determination prohibition area, and when the movement of the face is detected by the detection unit, the setting unit may release the setting of the determination prohibition area.

(7): In the aspect (6), the setting unit may set the detection area as the determination prohibition area again when it is determined in the determination of the registered user that the face is not the face of the registered user after releasing the setting of the determination prohibition area.

(8): In any one of the aspects (4) to (7), the setting unit may release the setting of the determination prohibition area when the face is no longer detected from the determination prohibition area.

(9): In any one of the aspects (1) to (8), the user determination unit may be able to perform a determination of the registered user with respect to another area other than the determination prohibition area, the lock release unit may release the lock when it is determined in the determination of the registered user that a face is a face of the registered user, and the setting unit may release the setting of the determination prohibition area when the lock is released by the lock release unit.

(10): In any one of the aspects (1) to (9), the setting unit may set the detection area as the determination prohibition area when the vehicle is parked.

(11): A vehicle control method according to an aspect of the present invention includes detecting, by a computer installed in a vehicle including an imaging unit configured to image surroundings of the vehicle, a face of a person in the surroundings with a first accuracy using an imaging result of the imaging unit operating at a first power consumption; operating, by the computer, the imaging unit with a second power consumption higher than the first power consumption when the face is detected with the first accuracy, and determining whether or not the detected face is a face of a registered user registered in advance with a second accuracy higher than the first accuracy using the imaging result of the imaging unit operating with the second power consumption; releasing, by the computer, a lock of a door according to a result of the determination; and setting, by the computer, a detection area in which the face is detected as a determination prohibition area in which the determination is not performed when it is determined in the determination that the face is not the face of the registered user.

(12): A computer-readable non-transitory storage medium according to an aspect of the present invention has a program stored therein, the program causing a computer installed in a vehicle including an imaging unit configured to image surroundings of the vehicle to: detect a face of a person in the surroundings with a first accuracy using an imaging result of the imaging unit operating at a first power consumption; operate the imaging unit with a second power consumption higher than the first power consumption when the face is detected with the first accuracy, and determine whether or not the detected face is a face of a registered user registered in advance with a second accuracy higher than the first accuracy using the imaging result of the imaging unit operating with the second power consumption; release a lock of a door according to a result of the determination; and set a detection area in which the face is detected as a determination prohibition area in which the determination is not performed when it is determined in the determination that the face is not the face of the registered user.

According to (1) to (12), it is possible to curb a decrease in the amount of electricity stored in a battery.

DETAILED DESCRIPTION OF THE INVENTION

Hereinafter, Embodiments 1 to 3 of a vehicle control device, a vehicle control method, and a storage medium of the present invention will be described with reference to the drawings. A case in which a face is authenticated by using an imaging result of a camera that images the outside of a vehicle when the vehicle is parked, and a lock of a door is released will be described in Embodiments 1 to 3.

Embodiment 11

Figure 1:
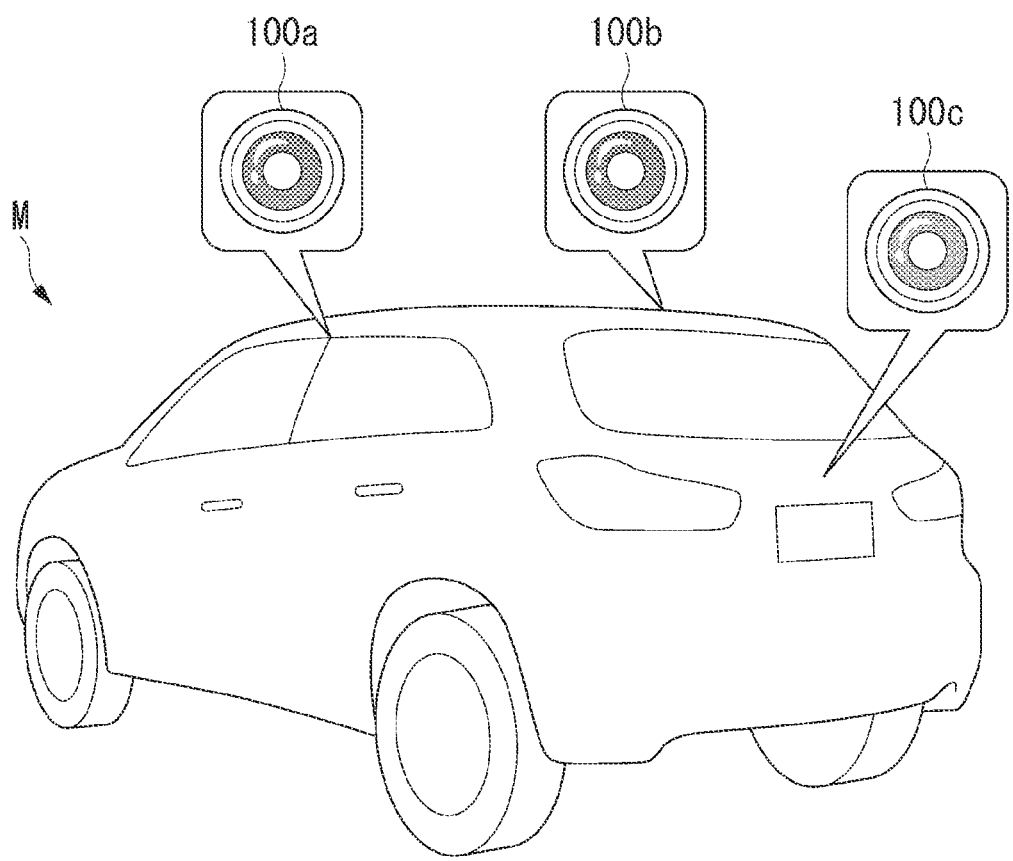
FIG. 1 is a diagram showing a configuration of a vehicle M on which a vehicle control device according to an embodiment is mounted.

First, Embodiment 1 will be described. FIG. 1 is a diagram showing a configuration of a vehicle M on which a vehicle control device according to an embodiment is mounted. A camera 100 (an example of an imaging unit) that images the outside is disposed in the vehicle M. The camera 100 includes a left camera 100*a*, a right camera 100*b*, and a rear camera 100*c* with respect to a forward direction of the vehicle. The left camera 100*a* is disposed in an upper portion of a center pillar on the left of the vehicle M. The right camera 100*b* is disposed in an upper portion of a center pillar on the right of the vehicle M. The rear camera 100*c* is disposed around a license plate at the rear of the vehicle M.

A sport utility vehicle (SUV) type vehicle is shown, but the rear camera 100*c* is disposed around a rear emblem in the case of a sedan type vehicle or is disposed under a rear glass in the case of a minivan type vehicle. The camera 100 is a small camera and, for example, a charge coupled device (CCD) camera or a complementary metal oxide semiconductor (CMOS) camera is used therefor. The camera 100 operates using electricity stored in the battery 220. The image captured by the camera 100 is, for example, a moving image, but may be a still image. The number of cameras 100 may be a number other than 3. A disposition position of the camera 100 is not limited to a disposition position as described above, and may be any position as long as the surroundings of the vehicle M can be imaged.

The camera 100 can operate in either a high-power mode or a low-power mode. The high-power mode is a mode in which imaging is performed with high accuracy (high resolution) and power consumption is high. The low-power mode is a mode in which imaging is performed with low accuracy (low resolution) and power consumption is low. In the present embodiment, one camera 100 captures images with high resolution and low resolution, but the present invention is not limited thereto and a camera for high resolution and a camera for low resolution may be provided separately.

The camera 100 images the surroundings of the vehicle M. The camera 100 constantly captures a position in which an image of a face of a person can be obtained. For example, the camera 100 images a person approaching the vehicle M in a height range of 0.5 m to 2.5 m. The camera 100 constantly operates in the low-power mode while the vehicle M is parked. Being parked means, for example, a state in which a power of the vehicle M is turned off and the door is locked. That is, when the power of the vehicle is turned on or when a door is not locked, the camera 100 does not operate in the low-power mode and turns off an imaging function.

[Functional Configuration of Vehicle Control Device 200]

Figure 2:
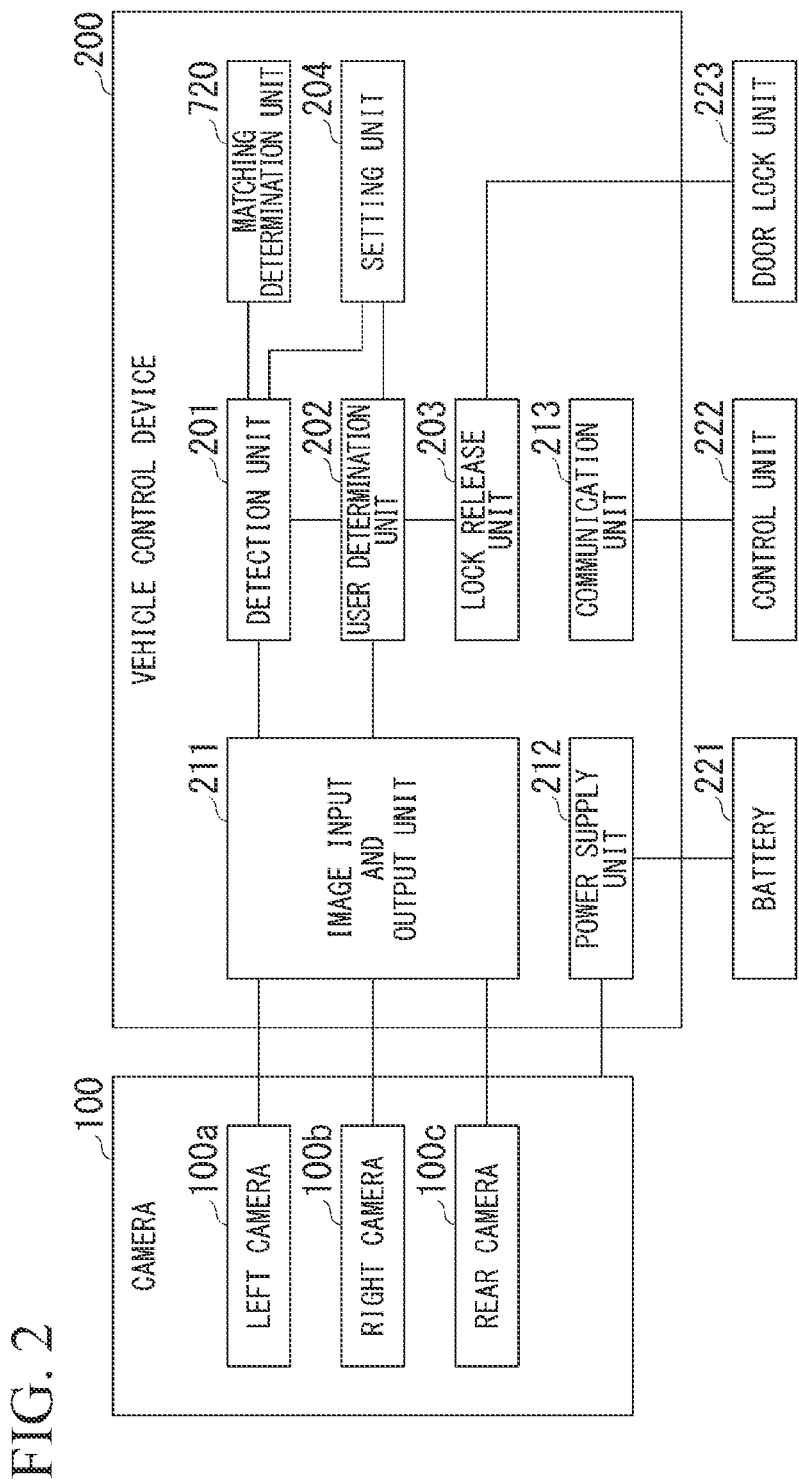
FIG. 2 is a block diagram showing an example of a functional configuration of a vehicle control device 200.

FIG. 2 is a block diagram showing an example of a functional configuration of the vehicle control device 200. The vehicle control device 200 is realized by, for example, an electronic control unit (ECU). The vehicle control device 200 includes an image input and output unit 211, a power supply unit 212, and a communication unit 213. The image input and output unit 211 is an interface between the camera 100 and the vehicle control device 200. The image input and output unit 211 outputs an imaging result of the camera 100 to a detection unit 201 or a user determination unit 202. When the user determination unit 202 inputs an instruction to switch the camera 100 from the low-power mode to the high-power mode, the image input and output unit 211 outputs the instruction to the camera 100 that is a target.

The power supply unit 212 uses electricity supplied from the battery 221 to drive the vehicle control device 200 and the camera. The communication unit 213 is a communication interface with the control unit 222. The control unit 222 is, for example, a body control module (BCM). The BCM comprehensively manages and controls in-vehicle devices of the vehicle 10, such as a lighting device, a wiper device, an air conditioning system, and a seat adjustment device.

As shown in FIG. 2, the vehicle control device 200 includes the detection unit 201, the user determination unit 202, a lock release unit 203, and a setting unit 204. These components are realized, for example, by a hardware processor such as a central processing unit (CPU) executing a program (software). Some or all of these components may be realized by hardware (a circuit unit; including circuitry) such as a large scale integration (LSI), an application specific integrated circuit (ASIC), a field-programmable gate array (FPGA), or a graphics processing unit (GPU), or may be realized by software and hardware in cooperation. The program may be stored in a storage device (not shown) such as an HDD or a flash memory of the vehicle control device 200 in advance or may be stored in a detachable storage medium such as a DVD or a CD-ROM and installed in the HDD or flash memory of the vehicle control device 200 by the storage medium being mounted in a drive device.

The detection unit 201 detects a face of a person around the vehicle M with low resolution (an example of the first accuracy) by using an imaging result of the camera 100 operating with low power (an example of a first power consumption). The detection unit 201 can constantly detect the face of the person in the surroundings with low resolution while the vehicle M is parked. The detection unit 201 analyzes a low-resolution image, extracts a feature quantity of a face, and performs authentication of the face of the person.

When the face is detected by the detection unit 201, the user determination unit 202 operates the camera 100 with high power (an example of a second power consumption), and performs user determination (authentication) to determine whether or not the face detected by the detection unit 201 with high resolution (an example of the second accuracy) is a face of a registered user registered in advance. The user determination unit 202 operates the camera 100 disposed in a direction in which a person approaches in the high-power mode. Specifically, when a person approaches from the left, the user determination unit 202 operates the left camera 100a in the high-power mode.

The registered user is, for example, an owner of the vehicle M or his or her family. The user determination unit 202 analyzes a high-resolution image to extract a feature quantity of a face, and matches the extracted feature quantity with the feature quantity registered in a database in advance to specify a person with a highest matching score. When the specified person is the owner of the vehicle M, the authentication is successful. The database that stores the feature quantity of the face may be included in an external device. A storage unit of the vehicle control device 200 may store a feature quantity of a user for matching.

Hereinafter, the user determination may be referred to as "authentication". In the user determination, determining that a face is a face of a registered user may be referred to as "user authentication is successful". In the user determination, determining that the face is not a face of a user may be referred to as "the user authentication fails".

The lock release unit 203 releases a lock of the door lock unit 223 according to a result of the user determination. For example, the lock release unit 203 releases the lock when the authentication is successful in the user determination. On the other hand, the lock release unit 203 holds the lock when the authentication fails in the user determination.

Here, the camera 100 constantly operates in the low-power mode while the vehicle is parked. For example, it is assumed that a poster of a face of a person is posted around the parked vehicle M. In this case, the detection unit 201 detects the face in the poster at low resolution. Further, the user determination unit 202 performs the user determination on the face in the poster with high resolution. In this case, since the authentication of the user fails in the user determination, the lock is not released.

However, since the face in the poster is detected by the detection unit 201 again after the authentication of the user fails, the user determination unit 202 acquires a high-resolution image and performs authentication of the user again. That is, this becomes an infinite loop in which processing of detecting the face→operating the camera in the high-power mode→failing in the authentication of the user is repeated. Accordingly, since the camera 100 frequently operates in the high-power mode, an amount of electricity stored in the battery 221 decreases and the battery may run down.

Therefore, in the present embodiment, when the authentication of the user fails, the setting unit 204 sets a detection area in which the face is detected by the detection unit 201 as a determination prohibition area in which the user determination is not performed for a predetermined period of time. The predetermined period of time is a period of time until a release condition to be described below is satisfied.

An example in which the user determination unit 202 is prevented from performing the user determination will be described. For example, the determination prohibition area is an area in which face detection in the detection unit 201 is prohibited (hereinafter referred to as a "detection prohibition area"). In other words, the detection unit 201 does not detect a face in the detection prohibition area, but detects a face in an area other than the detection prohibition area. Accordingly, since the face is not detected in the detection prohibition area by the detection unit 201, the user determination unit 202 does not perform the user determination with respect to a face in the detection prohibition area (a determination prohibition area).

Figure 3:
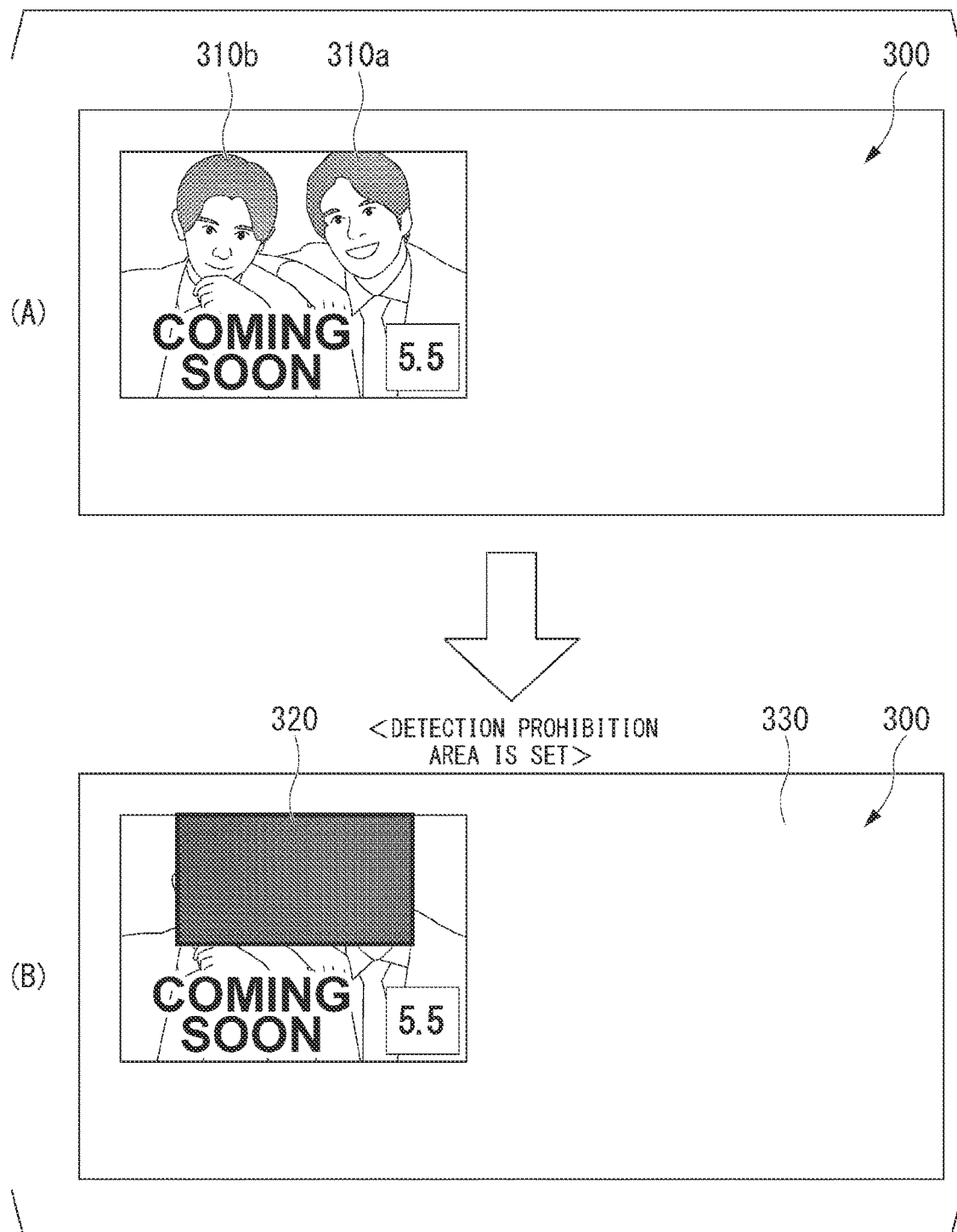
FIG. 3 is an illustrative diagram showing a specific example when a detection prohibition area is set.

This will be described with reference to FIG. 3. FIG. 3 is an illustrative diagram showing a specific example when a detection prohibition area is set. FIG. 3(A) shows an imaging result of the camera 100 (for example, the left camera 100a) when the vehicle M is parked near a poster. In FIG. 3(A), the detection unit 201 detects faces 310 (310a and 310b) of persons in the poster. When the face 310 is detected by the detection unit 201, the user determination unit 202 operates the left camera 100a in the high-power mode to obtain a high-resolution image of the face 310, and performs a user determination. The faces 310a and 310b shown in FIG. 3(A) both differ from the face of the user. Therefore, the user determination unit 202 determines in the user determination that the face is not the face of the registered user.

When it is determined in the user determination that the face is not the face of the registered user, the detection unit 201 sets a position (detection area) of the face 310 of the person in the poster as the detection prohibition area 320, as shown in FIG. 3(B). The detection prohibition area 320 is an area in which the detection of a face in the detection unit 201 is prohibited in the imaging area 300. Since a face is not detected in the detection prohibition area 320, the user determination in the user determination unit 202 is not performed. In other words, the user determination unit 202 does not obtain a high-resolution image with respect to the detection prohibition area 320. That is, since the user determination unit 202 does not obtain a high-resolution image with respect to the detection prohibition area 320, the user determination unit 202 does not operate the camera 100 in the high-power mode.

The detection unit 201 performs detection of the face in another imaging area 330 other than the detection prohibition area 320 in the imaging area 300. Similarly, the user determination unit 202 performs the user determination with respect to the other imaging area 330.

Although the setting unit 204 may set the detection area as the detection prohibition area when the authentication of the user fails once, the detection area is set as the detection prohibition area when the authentication of the user fails a plurality of times in the present embodiment. Specifically, the user determination unit 202 performs a user determination a plurality of times. The setting unit 204 sets the detection area as the determination prohibition area on the basis of determination results of the user determination performed a plurality of times. For example, the setting unit 204 sets the detection area as the detection prohibition area when it is determined in the user determination that a face is not the face of the registered user three times in a row. The setting unit 204 may set the detection area as the detection prohibition area according to a ratio between successes and failures of the authentication in the user determinations performed a plurality of times. Thus, since it is possible to improve the reliability of the user determination by using the results of user determinations performed a plurality of times, it is possible to curb erroneous setting of the detection prohibition area 320.

Next, a release condition for releasing a setting of the detection prohibition area 320 will be described. The release condition is, for example, releasing of the lock of the door lock unit 223. This will be specifically described. The user determination unit 202 performs a user determination with respect to the other imaging area 330 different from the detection prohibition area 320. Specifically, when the detection unit 201 detects a face in the other imaging area 330, the user determination unit 202 operates the camera 100 in the high-power mode to obtain a high-resolution image of the face, and performs the user determination.

When the authentication of the face detected from the other imaging area 330 is successful in the user determination, the lock release unit 203 releases a door lock of the door lock unit 223. When the lock is released by the lock release unit 203, the setting unit 204 releases the setting of the detection prohibition area 320.

In the present embodiment, a case in which a poster is posted around the vehicle M will be described by way of example, but a face is similarly detected at low resolution, for example, also when a doll or a statue as well as a poster is installed around the vehicle M.

[Prohibition Control Processing in High Power Mode Performed by Vehicle Control Device 200 According to Embodiment 1]

Figure 4:
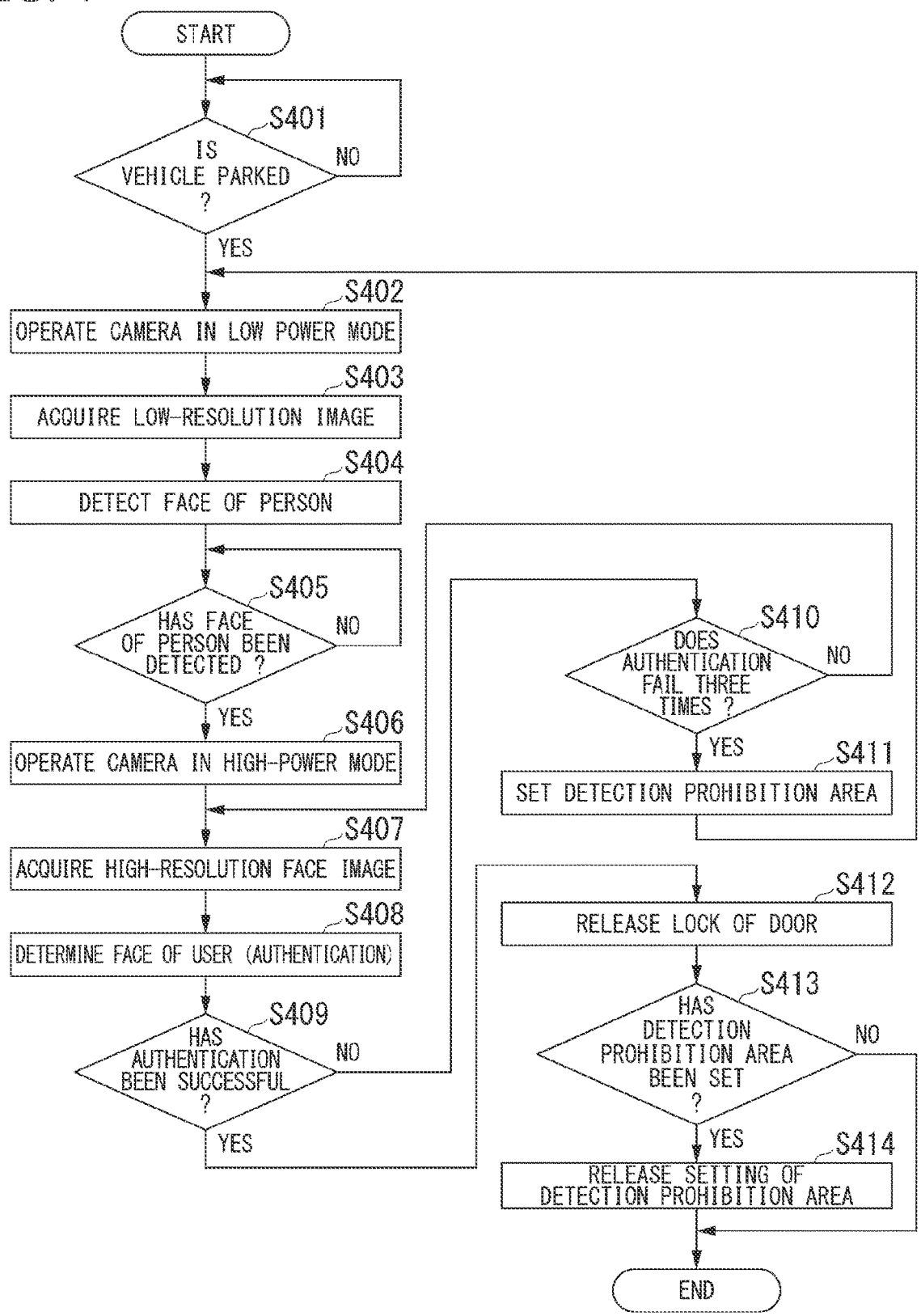
FIG. 4 is a flowchart showing an example of prohibition control processing in a high-power mode that is performed by the vehicle control device 200 according to Embodiment 1.

FIG. 4 is a flowchart showing an example of prohibition control processing in a high-power mode that is that is performed by the vehicle control device 200 according to Embodiment 1. In FIG. 4, the detection unit 201 determines whether or not the vehicle is parked (step S401). Being parked means, for example, a state in which a power of the vehicle M is turned off and the door is locked. The detection unit 201 waits until the vehicle M is parked. When the vehicle M is parked, the detection unit 201 operates the camera 100 in the low-power mode (step S402).

Next, the detection unit 201 acquires a low-resolution image from the camera 100 (step S403). The detection unit 201 starts detection of a face of a person using a low-resolution imaging result (step S404). The detection unit 201 determines whether or not a face of a person has been detected (step S405). The user determination unit 202 waits until the detection unit 201 detects the face of a person, and operates the camera 100 in the high-power mode when a face of a person is detected (step S406). Further, the user determination unit 202 acquires a high-resolution face image from the camera 100 (step S407).

The user determination unit 202 extracts a high-resolution face image (feature quantity) and performs a determination of the face of the user (user authentication) (step S408). Then, the user determination unit 202 determines whether or not the authentication of the user has been successful (step S409). When the authentication of the user fails, the setting unit 204 determines whether or not the authentication of the user has failed three times (step S410). When the authentication of the user has not failed three times, that is, when the authentication of the user fails once or twice, the setting unit 204 returns to step S406. When the authentication of the user fails three times, the setting unit 204 sets the detection prohibition area 320 (step S411) and returns to step S402.

When the authentication of the user is successful in step S408, the lock release unit 203 releases the lock of the door lock unit 223 (step S412). The setting unit 204 determines whether or not the detection prohibition area 320 had been set (step S413). When the detection prohibition area 320 has not been set, the setting unit 204 ends a series of processing. When the detection prohibition area 320 has been set, the setting unit 204 releases the setting of the detection prohibition area 320 (step S414) and ends the series of processing.

As described above, when the vehicle control device 200 of the present embodiment determines in the user determination that a face is not the face of the registered user, the vehicle control device 200 sets the detection area in which the face has been detected by the detection unit 201 as the determination prohibition area (the detection prohibition area 320). This makes it possible to prevent the authentication of the user from being performed again after the authentication of the user fails. Therefore, it is possible to curb generation of an infinite loop in which the processing of detection of face→operating the camera in a high-power mode→failing in user authentication is repeated. This makes it possible to curb frequent operation of the camera 100 in the high-power mode. Therefore, it is possible to curb decrease in the amount of electricity stored in the battery 221 and prevent the battery from running down.

The vehicle control device 200 of the present embodiment sets the detection area as the detection prohibition area 320 on the basis of determination results of the user determinations performed a plurality of times. Accordingly, since it is possible to improve the reliability of the user determination, it is possible to curb erroneous setting of the detection prohibition area 320.

In the present embodiment, the determination prohibition area is defined as the detection prohibition area 320 (see FIG. 3) in which the detection of a face in the detection unit 201 is prohibited. Accordingly, since a face in the detection prohibition area 320 is not detected by the detection unit 201, it is possible to prevent the user determination unit 202 from performing the user determination. Therefore, it is possible to curb operating the camera 100 in the high-power mode in order to obtain a high-resolution image with respect to the detection prohibition area 320. Therefore, it is possible to curb decrease in the amount of electricity stored in the battery 221.

The vehicle control device 200 of the present embodiment releases the setting of the detection prohibition area 320 when the door lock is released. This makes it possible to curb the detection prohibition area 320 being left set in next parking and to perform detection of a face in the entire imaging area 300.

The vehicle control device 200 of the present embodiment sets the detection area as the detection prohibition area 320 when the vehicle is parked. Accordingly, it is possible to curb decrease in the amount of electricity stored in the battery 221 due to face authentication during parking.

The vehicle control device 200 according to the present embodiment may be linked to a portable computer device such as a smartphone. For example, the vehicle control device 200 may release the setting of the detection prohibition area 320 when receiving information indicating that the user is approaching from the portable computer device. Accordingly, when the detection prohibition area 320 is set, it is possible to release the door lock by performing detection of the face and a user determination even when the user approaches from a direction of the detection prohibition area 320.

In the present embodiment, the vehicle control device 200 may be reset on a daily basis. That is, the setting of the detection prohibition area 320 may be released at a specific time or when a brightness is reached. However, when there is a poster of a face near the vehicle M, the detection prohibition area 320 is set again.

Embodiment 2

Next, Embodiment 2 will be described. In Embodiment 1 described above, a case in which the detection prohibition area 320 (see FIG. 3) in which a face is not detected by the detection unit 201 is set as the determination prohibition area in which the user determination unit 202 does not perform the user determination has been described. In Embodiment 2, a case in which the authentication neglection area is set as the determination prohibition area in which the user determination unit 202 does not perform the user determination will be described. In the following description, the same pieces of content as those described in Embodiment 1 are denoted by the same reference signs, and description thereof will be omitted appropriately.

Figure 5:
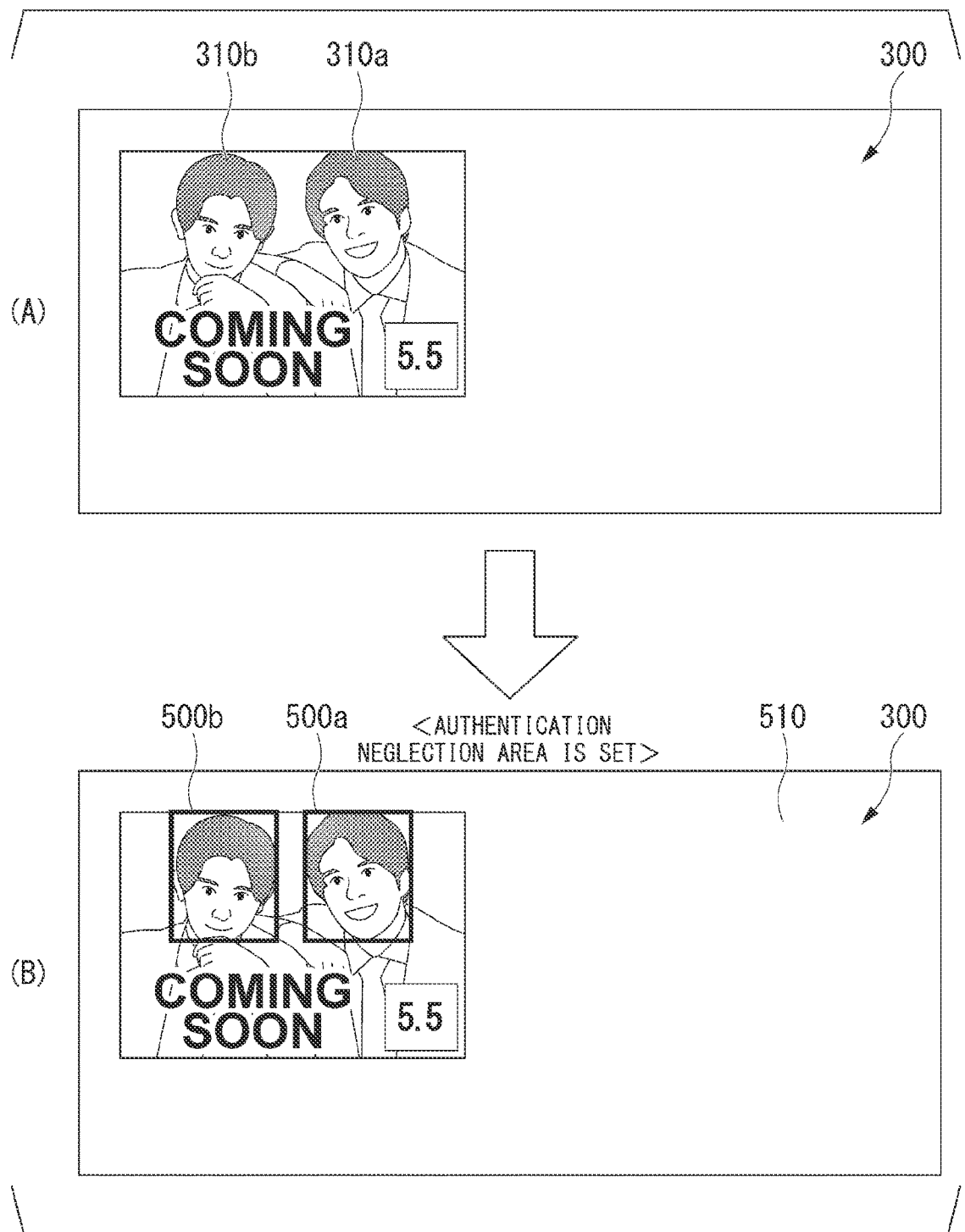
FIG. 5 is an illustrative diagram showing a specific example when an authentication neglection area is set in Embodiment 2.

FIG. 5 is an illustrative diagram showing a specific example when the authentication neglection area of Embodiment 2 is set. FIG. 5(A) is the same as FIG. 3(A). In FIG. 5(A), when the face 310 is authenticated by the detection unit 201, the user determination unit 202 determines in a user determination that a face is not the face of the registered user.

When it is determined in the user determination that the face is not the face of the registered user, the setting unit 204 sets a position (detection area) of the face 310 of the person in the poster as the authentication neglection area 500 (500a and 500b), as shown in FIG. 5(B). The authentication neglection area 500 is an area in which face detection in the detection unit 201 is possible. However, the authentication neglection area 500 is an area in which the user determination is not performed even when the face is detected by the detection unit 201. That is, the user determination unit 202 does not obtain a high-resolution image with respect to the authentication neglection area 500. That is, since the user determination unit 202 does not obtain the high-resolution image with respect to the authentication neglection area 500, the camera 100 is not operated in the high-power mode.

The detection unit 201 performs detection of a face in an imaging area 510 other than the authentication neglection area 500 in the imaging area 300. Similarly, the user determination unit 202 performs a user determination with respect to the other imaging area 510.

Next, release conditions (three conditions) in which the user determination is not performed with respect to the authentication neglection area 500 in Embodiment 2 will be described. As a first condition, the user determination unit 202 releases the setting of the authentication neglection area 500 when the lock is released by the lock release unit 203. This makes it possible for the user determination unit 202 to perform the user determination in the entire imaging area 300 in subsequent parking.

A second release condition will be described. The detection unit 201 detects a movement of the face in the authentication neglection area 500 using a low-resolution image. Here, the fact that the movement of the face is detected means that the face is not a face in the poster. On the other hand, the fact that the movement of the face is not detected may mean that the face is likely to be the face in the poster. Therefore, when the movement of the face is detected by the detection unit 201, the setting unit 204 releases the setting of the authentication neglection area 500. This makes it possible for the user determination unit 202 to perform the second authentication with respect to the detection area that has been the authentication neglection area 500. That is, the user determination unit 202 can operate the camera 100 in the high-power mode and obtain a high-resolution face image with respect to the detection area.

The user determination unit 202 may fail in the user determination from the face in the detection area after the setting of the authentication neglection area 500 is released. That is, although the user determination unit 202 operates the camera 100 in the high-power mode to perform the user determination, the user determination unit 202 may determine that the face is not the face of the registered user. The face that the face is not the face of the registered user means that the face is, for example, a face of a suspicious person aiming at theft. In this case, the user determination unit 202 sets the detection area as the authentication neglection area 500 again so that the user determination unit 202 is prevented from performing the user determination.

Further, a third release condition will be described. The fact that the face in the authentication neglection area 500 is no longer detected by the detection unit 201 means that the face disappears from the authentication neglection area 500, that is, it is found that the face in the authentication neglection area 500 is not the face in the poster. Therefore, when the face in the authentication neglection area 500 is no longer detected by the detection unit 201 in a period of time in which the authentication neglection area 500 is set, the setting unit 204 releases the setting of the authentication neglection area 500.

[Prohibition Control Processing in High-Power Mode Performed by Vehicle Control Device 200 According to Embodiment 2]

Figure 6:
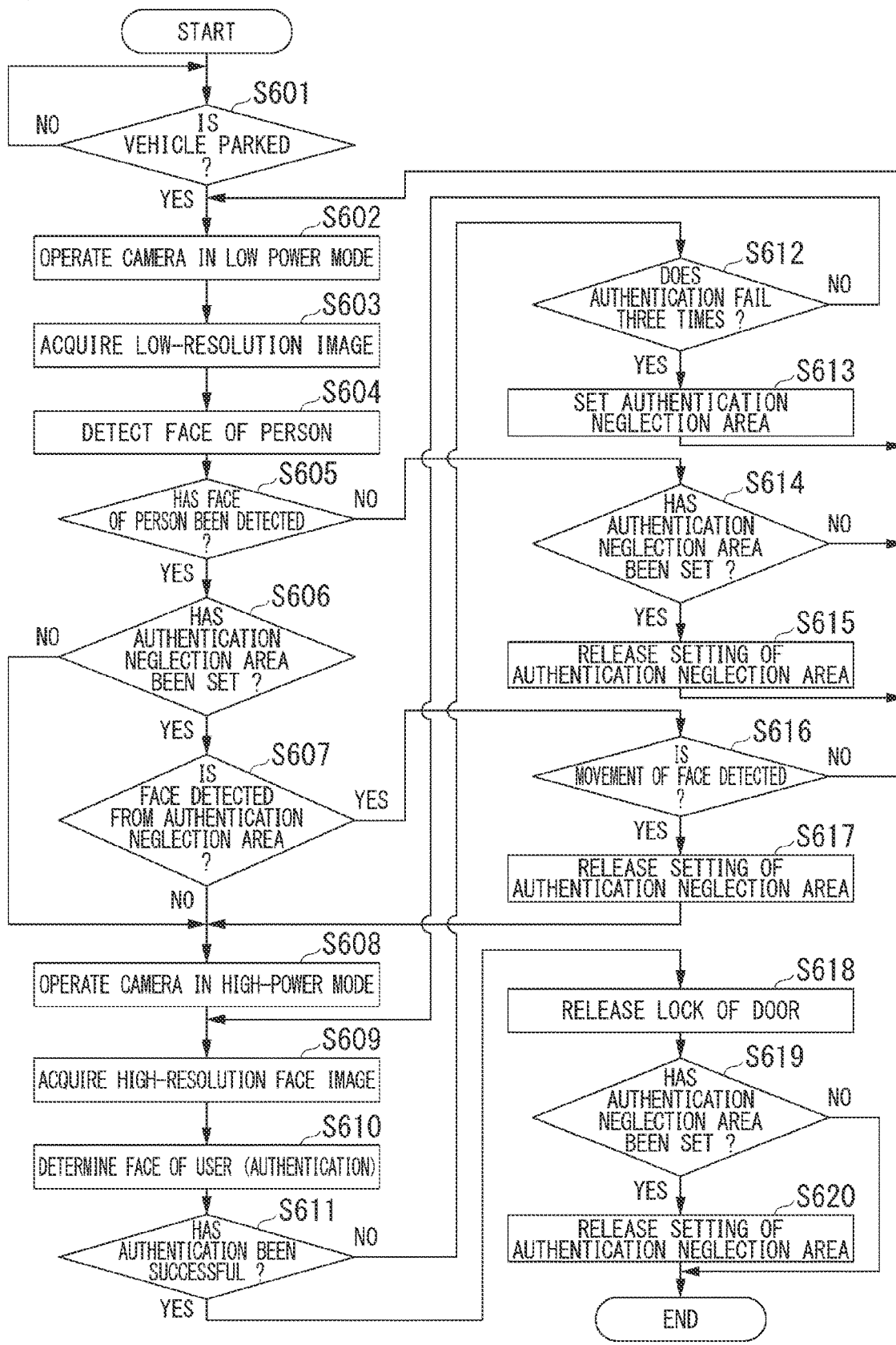
FIG. 6 is a flowchart showing an example of prohibition control processing in a high-power mode that is performed by a vehicle control device 200 according to Embodiment 2.

FIG. 6 is a flowchart showing an example of prohibition control processing in the high-power mode that is that is performed by the vehicle control device 200 according to Embodiment 2. In FIG. 6, the detection unit 201 determines whether or not the vehicle is parked (step S601). The detection unit 201 waits until the vehicle is parked. When the vehicle is parked, the detection unit 201 operates the camera 100 in the low-power mode (step S602).

Then, the detection unit 201 acquires a low-resolution image from the camera 100 (step S603). The detection unit 201 starts detection of a face of a person using a low-resolution imaging result (step S604). The detection unit 201 determines whether or not the face of the person has been detected (step S605). The setting unit 204 waits until the detection unit 201 detects the face of the person, and determines whether or not the authentication neglection area 500 has been set when the face of the person is detected (step S606).

When the authentication neglection area 500 has not been set, the setting unit 204 proceeds to step S608. When the authentication neglection area 500 has been set, the detection unit 201 determines whether or not the face is detected from the authentication neglection area 500 (step S607). When the face is not detected from the authentication neglection area 500, the user determination unit 202 operates the camera 100 in the high-power mode (step S608). Further, the user determination unit 202 acquires a high-resolution face image from the camera 100 (step S609).

The user determination unit 202 extracts a high-resolution face image (feature quantity) and performs a determination of the face of the user (user authentication) (step S610). Then, the user determination unit 202 determines whether or not the authentication of the user has been successful (step S611). When the authentication of the user fails, the setting unit 204 determines whether or not the authentication of the user fails three times (step S612). When the authentication of the user does not fail three times, that is, when the authentication of the user fails once or twice, the setting unit 204 returns to step S609. When the authentication of the user fails three times, the setting unit 204 sets the authentication neglection area 500 (step S613), and returns to step S602.

When the face of the person is not detected by the detection unit 201 in step S605, the setting unit 204 determines whether or not the authentication neglection area 500 has been set (step S614). When the authentication neglection area 500 has not been set, the setting unit 204 returns to step S602. When the authentication neglection area 500 has been set, that is, when the face disappears from the authentication neglection area 500, the setting unit 204 releases the setting of the authentication neglection area 500 (step S615) and returns to step S602.

When the face is detected from the authentication neglection area 500 in step S607, the detection unit 201 determines whether or not the movement of the face is detected by using the low-resolution image (step S616). When the movement of the face is not detected, the detection unit 201 returns to step S602. When the movement of the face is detected, the setting unit 204 releases the setting of the authentication neglection area 500 (step S617), and proceeds to step S608. The vehicle control device 200 performs the setting of the authentication neglection area 500 again when the vehicle control device 200 operates the camera 100 in the high-power mode after releasing the setting of the authentication neglection area 500, but the authentication of the user in the released area fails (steps S608 to S613).

When the authentication of the user is successful in step S611, the lock release unit 203 releases the lock of the door lock unit 223 (step S618). The setting unit 204 determines whether or not the authentication neglection area 500 has been set (step S619). When the authentication neglection area 500 has not been set, the setting unit 204 ends a series of processing. When the authentication neglection area 500 has been set, the setting unit 204 releases the setting of the authentication neglection area 500 (step S620) and ends the series of processing.

As described above, when the vehicle control device 200 of Embodiment 2 determines, in the user determination, that the face is not the face of the registered user, the detection area in which the face is detected by the detection unit 201 is set as the authentication neglection area 500 (see FIG. 5). Accordingly, even when the face in the poster is detected from the authentication neglection area 500 again after the authentication of the user fails, the area can be neglected so that the user determination is not performed. Therefore, it is possible to curb frequently operating the camera 100 in the high-power mode in order to obtain the high-resolution image with respect to the authentication neglection area 500. Therefore, it is possible to curb a decrease in the amount of electricity stored in the battery 221.

The vehicle control device 200 of Embodiment 2 releases the setting of the authentication neglection area 500 when the movement of the face in the authentication neglection area 500 is detected. Accordingly, when the face detected in the authentication neglection area 500 has a movement, it is possible to operate the camera 100 in the high-power mode to obtain a high-resolution image with respect to the area that has been the authentication neglection area 500. Therefore, it is possible to release the door lock by performing the user determination even on a face in the area that has been the authentication neglection area 500.

The vehicle control device 200 of Embodiment 2 may set the detection area as the authentication neglection area 500 again when it is determined in the user determination that a user is not a registered user after releasing the setting of the authentication neglection area 500. This makes it possible to prevent the user determination from being performed when a suspicious person approaches from a direction indicated by the authentication neglection area 500. Therefore, it is possible to curb frequently operating the camera 100 in the high-power mode in order to obtain the high-resolution image with respect to the authentication neglection area 500. It is possible to prevent the door lock from being released.

The vehicle control device 200 of Embodiment 2 releases the setting of the authentication neglection area 500 when the face is no longer detected from the authentication neglection area 500. Accordingly, when the face in the authentication neglection area 500 is not the face in the poster, it is possible to operate the camera 100 in the high-power mode to obtain the high-resolution image. Therefore, it is possible to release the door lock by performing the second authentication even on the face in the area that has been the authentication neglection area 500.

Embodiment 3

Next, Embodiment 3 will be described. In Embodiment 2 described above, a case in which the authentication neglection area 500 (see FIG. 5) is set as the determination prohibition area in which the user determination unit 202 does not perform the user determination has been described. In Embodiment 3, a case in which the user determination unit 202 sets a matching determination area in which a matching determination for the low-resolution images is performed as the determination prohibition area in which the user determination is not performed will be described.

Figure 7:
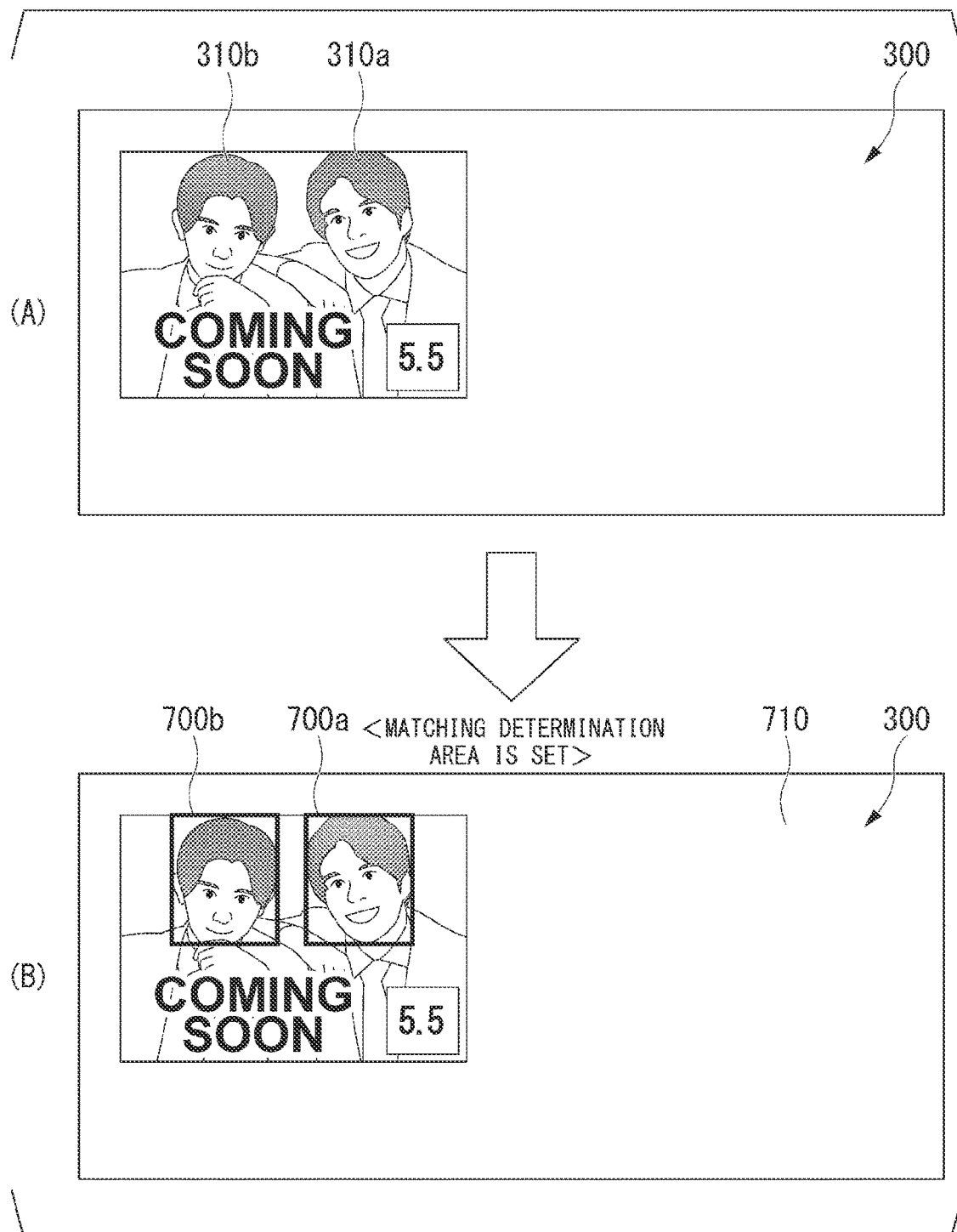
FIG. 7 is an illustrative diagram showing a specific example when a matching determination area is set in Embodiment 3.

FIG. 7 is an illustrative diagram showing a specific example when the matching determination area of Embodiment 3 is set. FIG. 7(A) is the same as FIG. 3(A). In FIG. 7(A), when the face 310 is authenticated by the detection unit 201, the user determination unit 202 determines in a user determination that a face is not the face of the registered user.

When it is determined in the user determination that the face is not the face of the registered user, the user determination unit 202 sets a position (detection area) of the face 310 of the person in the poster as the matching determination area 700 (700a and 700b), as shown in FIG. 7(B). The matching determination unit 720 (see FIG. 3) performs a matching determination as to whether or not a low-resolution face in the detection area when the authentication of the user fails matches a low-resolution face detected from the matching determination area 700 by the detection unit 201.

The matching determination unit 720 analyzes the low-resolution image to extract a feature quantity of the face, and performs the matching determination on the faces of the persons. The matching determination unit 720 may perform the matching determination by extracting edge points from the low-resolution image and comparing contours.

Here, matching in the matching determination means that the detected face is likely to be the face in the poster since the detected faces are the same faces. On the other hand, the fact that the faces do not match in the matching determination means that the face is not the face in the poster since there is a change in the detected face. Therefore, when it is determined in the matching determination that the faces are the same faces, the user determination unit 202 does not perform the user determination in the matching determination area 700. Therefore, the user determination unit 202 does not obtain a high-resolution image with respect to the matching determination area 700. That is, since the user determination unit 202 does not obtain the high-resolution image with respect to the matching determination area 700, the camera 100 is prevented from operating in the high-power mode. On the other hand, when it is determined in the matching determination that the faces are not the same faces, the user determination unit 202 performs the second authentication in the matching determination area 700.

The detection unit 201 performs detection of a face with respect to another imaging area 710 other than the matching determination area 700 in the imaging area 300. Similarly, the user determination unit 202 performs a user determination with respect to the other imaging area 710. In Embodiment 3, release conditions (three conditions) for the matching determination area 700 are the same as the release conditions of the authentication neglection area 500 in Embodiment 2.

[Prohibition Control Processing in High-Power Mode Performed by Vehicle Control Device 200 According to Embodiment 3]

Figure 8:
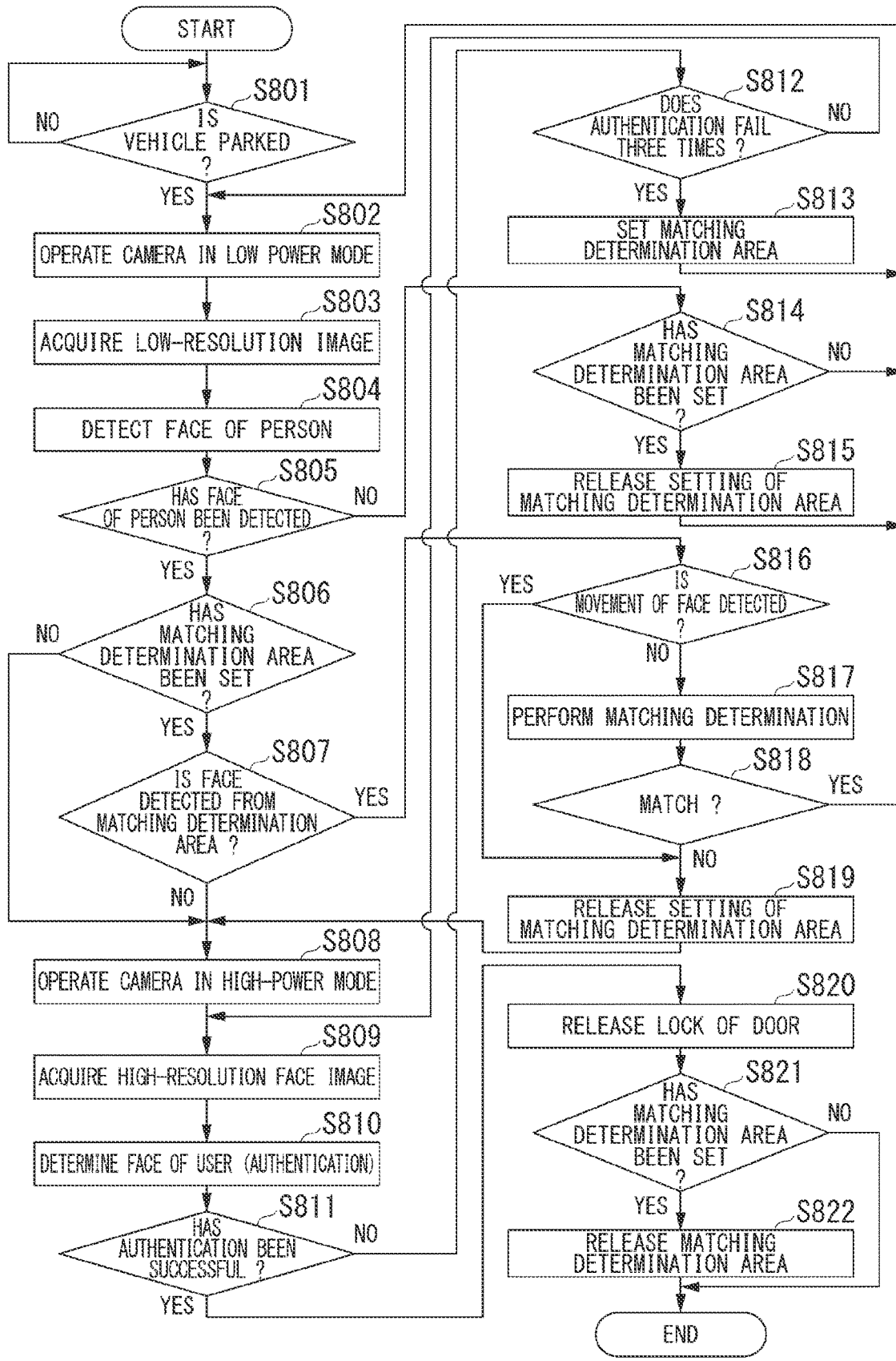
FIG. 8 is a flowchart showing an example of a prohibition control processing in a high-power mode that is performed by a vehicle control device 200 according to Embodiment 3.

FIG. 8 is a flowchart showing an example of prohibition control processing in a high-power mode that is that is performed by the vehicle control device 200 according to Embodiment 3. In FIG. 8, the detection unit 201 determines whether or not the vehicle is parked (step S801). The detection unit 201 waits until the vehicle is parked. When the vehicle is parked, the detection unit 201 operates the camera 100 in a low-power mode (step S802).

Then, the detection unit 201 acquires a low-resolution image from the camera 100 (step S803). The detection unit 201 starts a detection of a face of a person using a low-resolution imaging result (step S804). The detection unit 201 determines whether or not the face of the person has been detected (step S805). The setting unit 204 waits until the face of the person is detected by the detection unit 201, and determines whether or not the matching determination area 700 has been set when the face of the person is detected (step S806).

When the matching determination area 700 has not been set, the setting unit 204 proceeds to step S808. When the matching determination area 700 has been set, the detection unit 201 determines whether or not the face is detected from the matching determination area 700 (step S807). When the face is not detected from the matching determination area 700, the user determination unit 202 operates the camera 100 in the high-power mode (step S808). Further, the user determination unit 202 acquires a high-resolution face image from the camera 100 (step S809).

The user determination unit 202 extracts a high-resolution face image (feature quantity) and performs a determination of the face of the user (user authentication) (step S810). Then, the user determination unit 202 determines whether or not the authentication of the user has been successful (step S811). When the authentication of the user fails, the setting unit 204 determines whether or not the authentication of the user fails three times (step S812). When the authentication of the user does not fail three times, that is, when the authentication of the user fails once or twice, the setting unit 204 returns to step S809. When the authentication of the user fails three times, the setting unit 204 sets the matching determination area 700 (step S813) and returns to step S802.

When the face of the person is not detected by the detection unit 201 in step S805, the setting unit 204 determines whether or not the matching determination area 700 has been set (step S814). When the matching determination area 700 has not been set, the setting unit 204 returns to step S802. When the matching determination area 700 has been set, that is, when the face is no longer detected from the matching determination area 700, the setting unit 204 releases the setting of the matching determination area 700 (step S815) and returns to step S802.

When the face is detected from the matching determination area 700 in step S807, the detection unit 201 determines whether or not the movement of the face is detected (step S816). When the movement of the face is detected, the detection unit 201 proceeds to step S819. When the movement of the face is not detected, the matching determination unit 720 performs a matching determination between the low-resolution face when the authentication of the user fails and the low-resolution face detected from the matching determination area 700 this time (step S817). The matching determination unit 720 determines whether or not the faces match in the matching determination (step S818).

When the faces match in the matching determination, the matching determination unit 720 returns to step S802. When the faces do not match in the matching determination, the setting unit 204 releases the setting of the matching determination area 700 (step S819) and proceeds to step S808. The vehicle control device 200 sets the matching determination area 700 again when the vehicle control device 200 operates the camera 100 in the high-power mode after releasing the setting of the matching determination area 700, but the authentication of the user in the released area fails (steps S808 to S813).

When the authentication of the user is successful in step S811, the lock release unit 203 releases the lock of the door lock unit 223 (step S820). The setting unit 204 determines whether or not the matching determination area 700 has been set (step S821). When the matching determination area 700 has not been set, the setting unit 204 ends a series of processing. When the matching determination area 700 has been set, the setting unit 204 releases the setting of the matching determination area 700 (step S822) and ends the series of processing.

As described above, when the vehicle control device 200 of Embodiment 3 determines in the user determination that the face is not the face of the registered user, the vehicle control device 200 sets the detection area in which the face is detected by the detection unit 201 as the matching determination area 700 (FIG. 7) so that the user determination is prevented from being performed when the faces match in the matching determination. This makes it possible to prevent the user determination from being performed when a detected face is the same as the face in the detection area even when the face in the poster is detected from the matching determination area 700 again after the authentication of the user fails. Therefore, it is possible to curb frequently operating the camera 100 in the high-power mode in order to obtain the high-resolution image with respect to the matching determination area 700. Therefore, it is possible to curb a decrease in the amount of electricity stored in the battery 221.

Although modes for carrying out the present invention have been described above using the embodiments, the present invention is not limited to these embodiments, and various modifications and substitutions can be made without departing from the gist of the present invention.

What is claimed is:

1. A vehicle control device comprising:
   a processor configured to execute a program to:
   image surroundings of a vehicle;
   detect a first face of a person in the surroundings with a first accuracy using an imaging result of the imaging of the surroundings at a first power consumption;
   operate the imaging of the surroundings with a second power consumption higher than the first power consumption when the first face is detected, and determine whether or not the first face is a second face of a registered user registered in advance with a second accuracy higher than the first accuracy using the imaging result of the imaging operating with the second power consumption;
   release a lock of a door according to a result of the determination whether or not the first face is the second face of the registered user; and
   set a detection area in which the first face has been detected as a determination prohibition area in which additional determinations of any face, including the first face, are not performed when it is determined that the first face is not the second face of the registered user.

2. The vehicle control device according to claim 1,
   wherein the processor is configured to execute the program to:
   perform the determination of the registered user a plurality of times, and
   set the detection area as the determination prohibition area on the basis of results of a plurality of determinations.

3. The vehicle control device according to claim 1, wherein the determination prohibition area is an area in which detection of one or more faces is prohibited.

4. The vehicle control device according to claim 1, wherein the determination whether or not the first face is the second face of the registered user is a first determination, and
   wherein the determination prohibition area is an area in which detection of a third face by the processor is possible, and
   the processor does not perform a second determination of the registered user based on the third face detected in the determination prohibition area.

5. The vehicle control device according to claim 4, the processor is configured to execute the program to:
   detect a movement of the third face in the determination prohibition area, and
   when the movement of the third face is detected, the processor is configured to execute the program to release the setting of the determination prohibition area.

6. The vehicle control device according to claim 5, wherein the processor is configured to execute the program to set the detection area as the determination prohibition area again when it is determined in the determination of the registered user that the third face is not the second face of the registered user after releasing the setting of the determination prohibition area.

7. The vehicle control device according to claim 4, wherein the processor is configured to execute the program to release the setting of the determination prohibition area when the third face is no longer detected in the determination prohibition area.

8. The vehicle control device according to claim 1, wherein the determination whether or not the first face is the second face of the registered user is a first determination, and
   wherein the determination prohibition area is an area in which detection of a third face by the processor is possible, the processor is further configured to execute the program to:
   perform a second determination as to whether or not a fourth face in the detection area matches the third face detected from the determination prohibition area, and
   the processor does not perform a third determination of the registered user based on the fourth face being determined to match the third face.

9. The vehicle control device according to claim 1, wherein the processor is configured to execute the program to:
   perform a determination of the registered user with respect to another area other than the determination prohibition area,
   release the lock when it is determined in the determination of the registered user that the first face is the second face of the registered user, and
   release the setting of the determination prohibition area when the lock is released.

10. The vehicle control device according to claim 1, wherein the processor is configured to execute the program to set the detection area as the determination prohibition area when the vehicle is parked.

11. A vehicle control method comprising:
    detecting, by a computer installed in a vehicle including an imaging unit configured to image surroundings of the vehicle, a first face of a person in the surroundings with a first accuracy using an imaging result of the imaging unit operating at a first power consumption;
    operating, by the computer, the imaging unit with a second power consumption higher than the first power consumption when the first face is detected with the first accuracy, and determining whether or not the first face is a second face of a registered user registered in advance with a second accuracy higher than the first accuracy using the imaging result of the imaging unit operating with the second power consumption;
    releasing, by the computer, a lock of a door according to a result of the determination; and
    setting, by the computer, a detection area in which the first face is detected as a determination prohibition area in which additional determinations of any face, including the first face, are not performed when it is determined in the determination that the first face is not the second face of the registered user.

12. A computer-readable non-transitory storage medium having a program stored therein, the program causing a computer installed in a vehicle including an imaging unit configured to image surroundings of the vehicle to:
    detect a first face of a person in the surroundings with a first accuracy using an imaging result of the imaging unit operating at a first power consumption;

operate the imaging unit with a second power consumption higher than the first power consumption when the first face is detected with the first accuracy, and determine whether or not the first face is a second face of a registered user registered in advance with a second accuracy higher than the first accuracy using the imaging result of the imaging unit operating with the second power consumption;

release a lock of a door according to a result of the determination; and set a detection area in which the first face is detected as a determination prohibition area in which additional determinations of any face, including the first face, are not performed when it is determined in the determination that the first face is not the second face of the registered user.

* * * * *